Nov. 21, 1944.　　　D. R. SMITH　　　2,363,154
FISH LADDER
Filed Jan. 14, 1944　　2 Sheets-Sheet 1
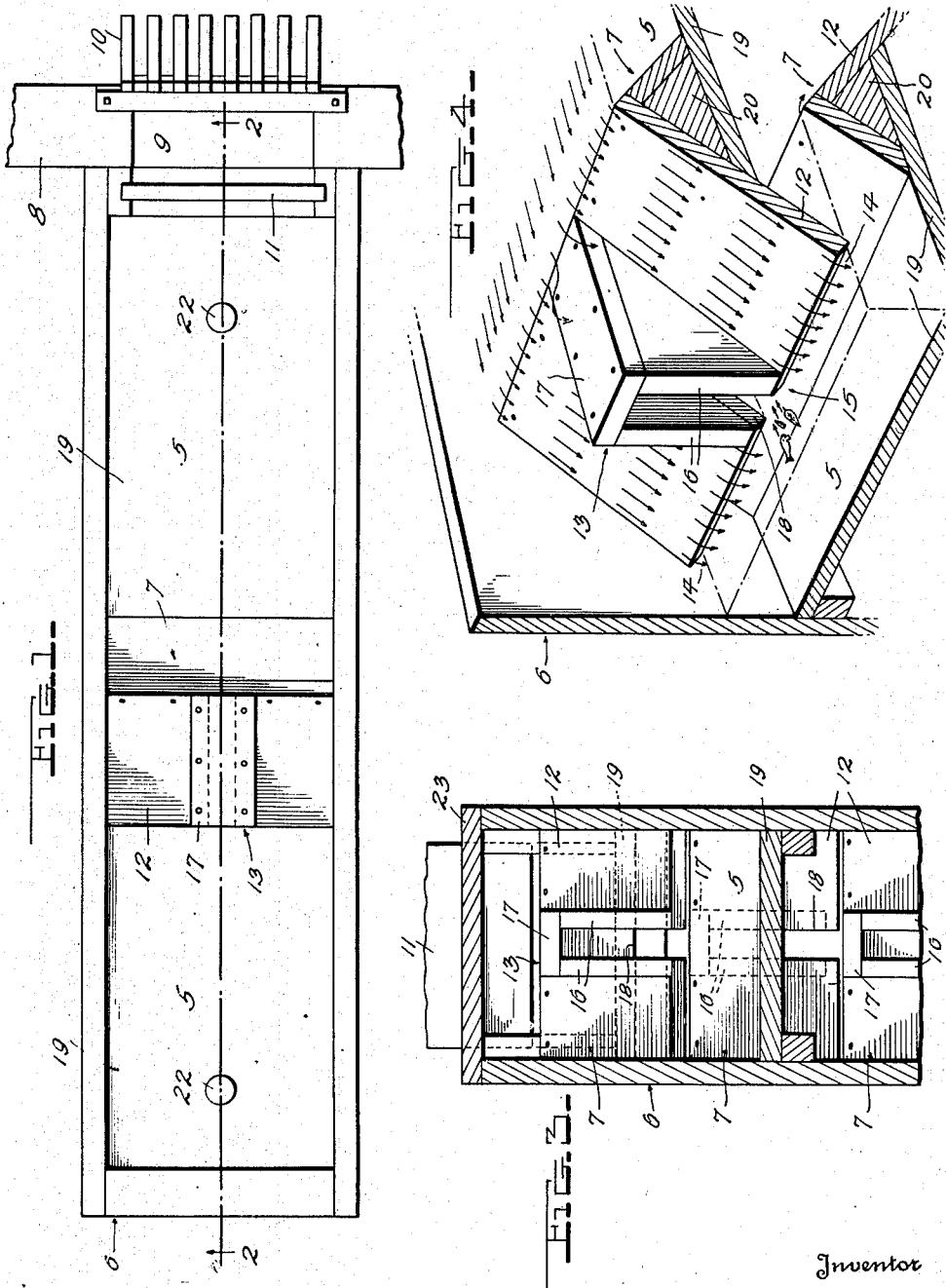
Inventor
D. R. Smith.

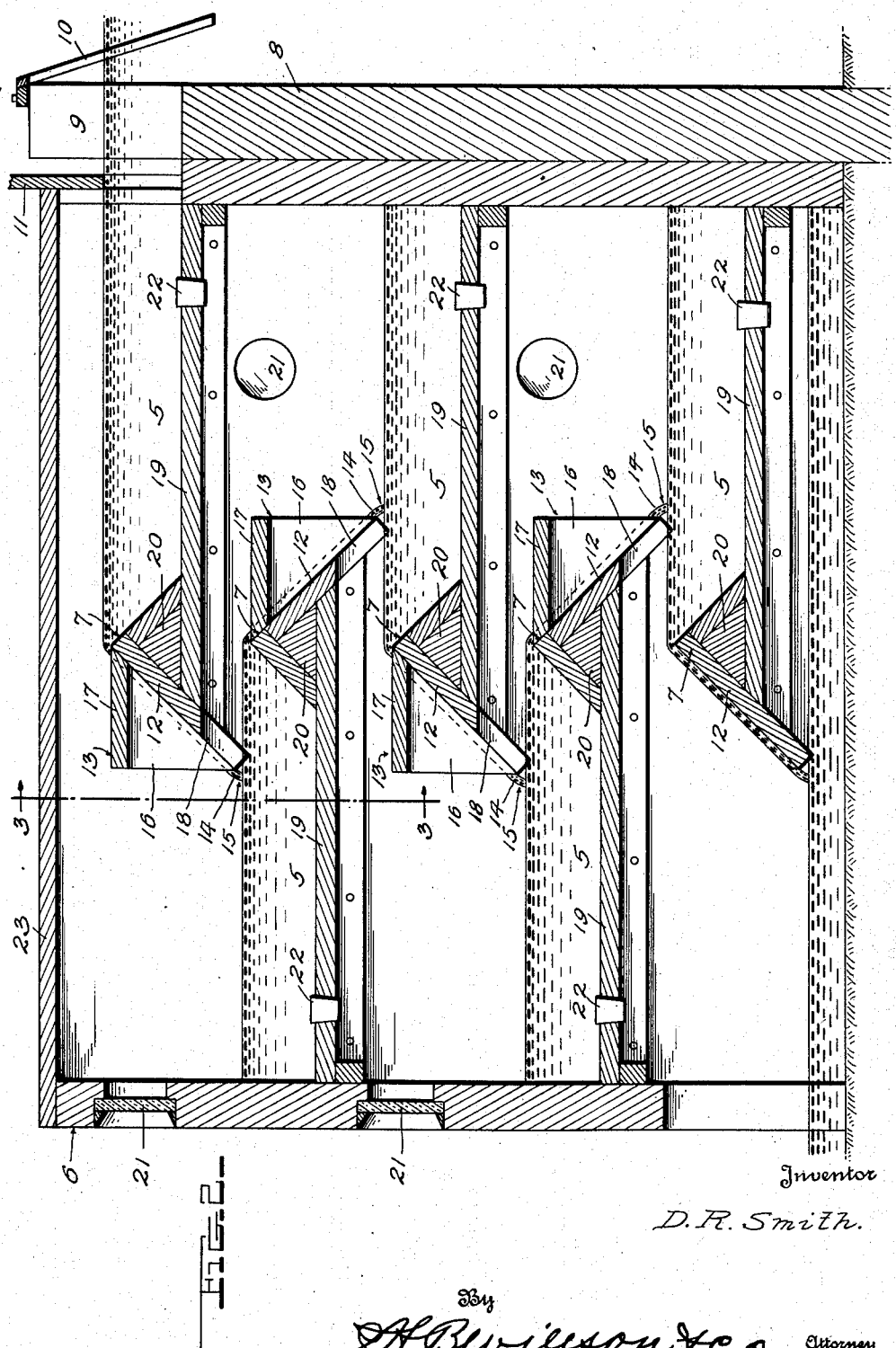

Patented Nov. 21, 1944

2,363,154

UNITED STATES PATENT OFFICE 2,363,154

FISH LADDER

Dell R. Smith, Everett, Wash.

Application January 14, 1944, Serial No. 518,297

7 Claims. (Cl. 61—21)

The invention relates to fish ladders of the general type in which the water successively spills from one rest basin to another, the basins being sufficiently close to each other to permit fish to ascend by jumping from one basin to the next.

The principal object of the invention is to provide a new and improved construction in which novel provision is made to permit debris to readily flow from the basins without interference by the water falling from the next basin above, and said provision also permits small fish to readily travel downstream.

Another object is to provide a novel construction which is simple and inexpensive, yet efficient and durable.

With the foregoing in view, the invention resides in the novel subject matter hereinafter described and claimed, description being accomplished by reference to the accompanying drawings.

Figure 1 is a top plan view of the improved fish ladder.

Fig. 2 is a vertical longitudinal sectional view on line 2—2 of Fig. 1.

Fig. 3 is a fragmentary transverse sectional view on line 3—3 of Fig. 2.

Fig. 4 is a fragmentary sectional perspective view.

A preferred form of construction has been illustrated in the drawings and will be rather specifically described, with the understanding, however, that within the scope of the invention as claimed, variations may be made.

Superposed and overlapped rest pool basins 5 are provided, preferably within an appropriate casing 6, each basin 5 having a dam 7 over which the water spills to the next lower basin and finally into the stream below the dam, waterfall or the like in connection with which the ladder is used. For illustrative purposes, it is shown in connection with a dam 8 having a spillway 9 through which water enters the uppermost of the basins 5. A suitable guard 10 is employed to prevent floating logs and the like from flowing through the spillway 9 and a gate 11 is shown to prohibit the entrance of water to the ladder when cleaning the latter or making repairs.

Each dam 7 has a declined chute 12 down which the water falls, and each dam (except possibly the lowermost) carries means 13 for dividing the falling water into two laterally spaced streams 14, leaving a space 15 between said streams 14, through which floating debris and small fish may readily travel down-stream without interference by the water falling down the chute 12 and entering the basin. The accumulation of floating trash and small fish in the basins is thus prevented.

The dividing means 13 preferably comprises two triangular side walls 16 secured to and rising from the chute 12 in laterally spaced relation, and a top wall 17 secured upon said side walls 16 to prohibit the entrance of water between them, as it spills over the dam 7. It is preferable that the lower end of each chute 12 be substantially at or below the water level of the basin 5 to which it delivers the water, to prevent the excessive turbulence which would otherwise be caused by the descending water streams 14. Therefore, when this relation of chute to water level is employed, it is necessary to form a notch 18 or other water passage in the lower end of the chute in order that the debris and small fish may pass without interference. The space between the lower ends of the side walls 16 of the divider 13, obviously constitutes another passage communicating with the passage 18, and it will be obvious that said divider might be of other construction than that herein disclosed and still be formed with an appropriate passage. However, the dividers 13 are preferably channel-shaped or of inverted U-shape as shown, and extend across the chute throughout its width. The dividers, it will be noted are made sufficiently wide to cause the two streams 14 to be spaced laterally from each a distance sufficient to leave the water in the space 15 relatively free from disturbance by the two falling streams.

In Fig. 4, I have diagrammatically illustrated the two separate streams of falling water 14 and have, in a general way, shown how floating debris and small fish may pass through the space 15 between said streams to travel on downstream, preventing accumulation in any of the basins 5.

The bottom 19 of each basin 5, in the present disclosure, extends inwardly from one end wall or the other of the casing 6 and extends from side to side of said casing, and the dam 7 of each basin is preferably of the transversely triangular form illustrated, readily formed from boards or planks and by preference having a triangular core bar 20. It will be understood, however, that these and other parts of the ladder may be made of concrete or other suitable materials; and that the ladder may be of any desired width or composed of a plurality of parallel units like the one illustrated.

Suitable windows 21 may be located wherever desired to admit light to the casing 6, not only for the benefit of the fish but to give light when cleaning out the basins. The bottom 19 of each basin, in this regard, may well have a clean-out plug 22.

During high or low water, should it be advisable to regulate the quantity flowing through the ladder, this may be done by proper setting of the gate 11, and in high water if the entire casing 6 should become filled, it will act as a perfect means through which the fish may actually swim from a low to a high level. During flood stages, floating debris will simply pass over the casing top 23 instead of entering said casing, and even if the gate 11 should be carried away, the loss will be negligible.

From the foregoing, taken in connection with the accompanying drawings, it will be seen that novel and advantageous provision has been disclosed for carrying out the objects of the invention, and while preferences have been illustrated, attention is again invited to the possibility of making variations within the scope of the invention as claimed.

I claim:

1. In a fish ladder, a plurality of superposed and overlapped basins having individual dams over which the water spills to the successive basins, the dams of adjacent basins being disposed at opposite ends thereof to cause the water to follow a zigzag course through the ladder, declined chutes on the discharge sides of said dams and upright dividers rising from said chutes for dividing the sheet of water passing down each chute to the next lower basin into separate laterally spaced streams, the width of said dividers being such as to leave the water areas between adjacent streams in each basin relatively free from disturbance by said adjacent streams, whereby floating debris and small fish in the basin which receives said adjacent streams may travel down-stream through the space between these streams without interference from the same.

2. In a fish ladder, a plurality of superposed and overlapped basins having individual dams over which the water spills to the successive basins, the dams of adjacent basins being disposed at opposite ends thereof to cause the water to follow a zigzag course through the ladder, and means for dividing the water falling from each dam into a plurality of separate laterally spaced streams, whereby floating debris and small fish in the basin which receives said separate laterally spaced streams may travel downstream through the space between said streams without interference from these streams, each of said dams having a declined chute down which said separate streams of water fall, said dividing means projecting upwardly from said chute, the lower end of said chute being at or below the water level of the next lower basin and having a passage under said dividing means through which debris and small fish may travel downstream.

3. In a fish ladder, a basin having a dam over which water spills, said dam having a forwardly declined chute down which the water falls, and a divider projecting upwardly from said chute for dividing the water falling down said chute into separate laterally spaced streams, the lower end of said chute having a water passage beneath said divider.

4. A structure as specified in claim 3; the said divider being channel-shaped and having its open lower portion registering with said passage of said chute.

5. In a fish ladder, a basin having a dam, said dam having a declined chute at its discharge side, said chute extending below the bottom of said basin, the extended lower portion of said chute having a water passage between its ends, and a substantially inverted U-shaped divider mounted on said dam and positioned over said passage.

6. In a fish ladder, a basin having a dam, said dam having a declined chute at its discharge side, said chute extending below the bottom of said basin, a second basin which directly receives all water flowing down said chute, the lower end of said chute being at or below the water level in said second basin and having a passage through which small fish and debris may travel back under the first mentioned basin and on downstream, the top of said passage being above the water level in said second basin, and water-diverting means on the upper side of said chute above said passage for excluding the descending water from said passage as it flows down said chute.

7. In a fish ladder, a basin having a dam, a second basin which directly receives all water flowing over said dam, and water-diverting means on the downstream side of said dam for preventing the descending water from striking part of the surface of the water in said second basin, leaving a relatively quiet water zone in said second basin in which small fish and debris may travel back under the first mentioned basin and on downstream.

DELL R. SMITH.